United States Patent
Dimson et al.

(10) Patent No.: US 10,496,750 B2
(45) Date of Patent: Dec. 3, 2019

(54) SYSTEMS AND METHODS FOR GENERATING CONTENT

(71) Applicant: Facebook, Inc., Menlo Park, CA (US)

(72) Inventors: Thomas Frederick Dimson, Stanford, CA (US); Clark Martin Gredoña, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 137 days.

(21) Appl. No.: 15/707,339

(22) Filed: Sep. 18, 2017

(65) Prior Publication Data

US 2019/0087410 A1  Mar. 21, 2019

(51) Int. Cl.
| | | |
|---|---|---|
| *G06F 17/27* | (2006.01) | |
| *G06F 3/0481* | (2013.01) | |
| *G06F 16/958* | (2019.01) | |
| *G06F 3/0488* | (2013.01) | |
| *G06F 3/0484* | (2013.01) | |

(52) U.S. Cl.
CPC ........ *G06F 17/2785* (2013.01); *G06F 3/0488* (2013.01); *G06F 3/04817* (2013.01); *G06F 3/04842* (2013.01); *G06F 16/972* (2019.01)

(58) Field of Classification Search
None
See application file for complete search history.

(56) References Cited

U.S. PATENT DOCUMENTS

| | | | |
|---|---|---|---|
| 2012/0096359 A1* | 4/2012 | Denney | G06K 9/00744 715/730 |
| 2012/0254188 A1* | 10/2012 | Koperski | G06F 16/285 707/740 |
| 2013/0124973 A1* | 5/2013 | Piccionelli | G06F 17/2247 715/234 |
| 2015/0178383 A1* | 6/2015 | Corrado | G06F 16/50 707/740 |
| 2018/0329990 A1* | 11/2018 | Severn | G06K 9/6223 |

* cited by examiner

*Primary Examiner* — Sanchita Roy
(74) *Attorney, Agent, or Firm* — Sheppard Mullin Richter & Hampton LLP

(57) ABSTRACT

Systems, methods, and non-transitory computer-readable media can project data describing a set of media items from which a representative media item is to be determined. A medoid can be determined from the projected data. A media item corresponding to the medoid can be selected as the representative media item of the set of media items.

20 Claims, 8 Drawing Sheets

SYSTEMS AND METHODS FOR GENERATING CONTENT

FIELD OF THE INVENTION

The present technology relates to the field of content generation. More particularly, the present technology relates to techniques for generating content for stories.

BACKGROUND

Users often utilize computing devices for a wide variety of purposes. Users can use their computing devices to, for example, interact with one another, access media content, share media content, and create media content. In some cases, media content can be provided by members of a social network. The media content can include one or a combination of text, images, videos, and audio. The media content may be published to the social network for consumption by others.

Under conventional approaches, users may post various media items to a social networking system. In general, media items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to project data describing a set of media items from which a representative media item is to be determined. A medoid can be determined from the projected data. A media item corresponding to the medoid can be selected as the representative media item of the set of media items.

In some embodiments, the systems, methods, and non-transitory computer readable media configured to perform determining respective semantic feature representations for each of the media items in the set; and projecting the semantic feature representations in a semantic space.

In some embodiments, a semantic feature representation corresponds to a high-dimensional floating point vector, and wherein the high-dimensional floating point vector is projected onto a two-dimensional semantic space.

In some embodiments, a semantic feature representation of a media item is determined based at least in part on visual features included in subject matter captured in the media item.

In some embodiments, the systems, methods, and non-transitory computer readable media configured to perform identifying a semantic feature representation corresponding to the medoid; and identifying the media item from which the semantic feature representation was determined.

In some embodiments, the set of media items correspond to media items included in a multi-author story, and wherein the representative media item is associated with the multi-author story.

In some embodiments, the representative media item is used as an icon to represent the multi-author story in an interface.

In some embodiments, the systems, methods, and non-transitory computer readable media configured to perform determining a new representative media item for the multi-author story in response to at least one trigger condition being satisfied.

In some embodiments, the trigger condition is satisfied when the media item corresponding to the medoid expires, after a specified time period, or a threshold change in the number of media items included in the set of media items.

In some embodiments, the systems, methods, and non-transitory computer readable media configured to perform obtaining an updated set of media items included in the multi-author story; projecting data describing the updated set of media items; determining a new medoid from the projected data; and selecting a new media item corresponding to the new medoid as the new representative media item of the updated set of media items.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
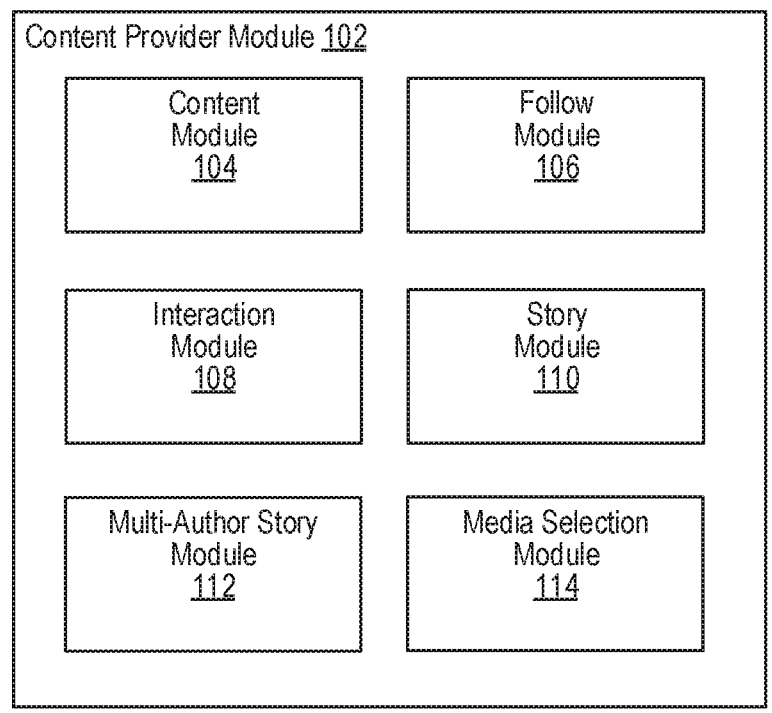
FIG. 1 illustrates an example system including an example content provider module, according to an embodiment of the present disclosure.
Figure 1:
Figure 1:
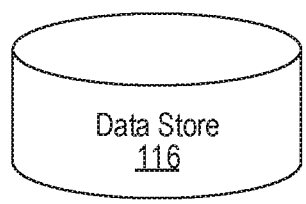

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Generating Content

Under conventional approaches, users may post various media items to a social networking system. In general, media items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

Media items posted by users can be grouped together and provided as a multi-author story. In general, options for accessing multi-author stories can be provided in an interface. A user interacting with this interface can select an option to access a corresponding multi-author story. In some instances, visually differentiating options corresponding to multi-author stories can enhance the user experience. For example, each option corresponding to a multi-author story can be associated with an image (e.g., icon, cover photo, thumbnail, etc.) that is representative of the media items included in the multi-author story. However, selecting a representative media item can be challenging given the myriad media items that may be included in a given multi-author story. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. For example, data describing a set of media items from which a representative media item is to be determined can be projected. A medoid can be determined from the projected data. A media item corresponding to the medoid can be selected as the representative media item of the set of media items. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a follow module 106, an interaction module 108, a story module 110, a multi-author story module 112, and a media selection module 114. In some instances, the example system 100 can include at least one data store 116. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 116, as shown in the example system 100. The at least one data store 116 can be configured to store and maintain various types of data. For example, the data store 116 can store information describing various content that has been posted by users of a social networking system. In some implementations, the at least one data store 116 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 116 can store information associated with users, such as user identifiers, user information, profile information, user specified settings, content produced or posted by users, and various other types of user data.

The content module 104 can be configured to provide users with access to content (e.g., media items) that is available through a social networking system. In some instances, this content can include media items that are posted in content feeds accessible through the social networking system. For example, the content module 104 can provide a first user with access to media items through an interface that is provided by a software application (e.g., a social networking application) running on a computing device of the first user. The first user can also interact with the interface to post media items to the social networking system. Such media items may include text, images, audio, and videos, for example. For example, the first user can submit a post to be published through the social networking system. In some embodiments, the post can include, or reference, one or more media items.

In various embodiments, other users of the social networking system can access media items posted by the first user. In one example, the other users can access the media items by searching for the first user, for example, by user name through an interface provided by a software application (e.g., a social networking application, browser, etc.) running on their respective computing devices. In some instances, some users may want to see media items posted by the first user in their respective content feed. To cause media items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that media items posted by the first user are no longer included in the content feed of the user.

In some instances, users may want to interact with posted media items. For example, a user may want to endorse, or "like", a media item. In this example, the user can select an option provided in the interface to like the desired media item. The interaction module 108 can determine when a user likes a given media item and can store information describing this relationship. The interaction module 108 can also determine when other forms of user interaction are performed and can store information describing the interaction (e.g., information describing the type of interaction, the identity of the user, the identity of the user that posted the media item, and the media item, to name some examples). For example, the user may want to post a comment in response to a media item. In this example, the user can select an option provided in the interface to enter and post the comment for the desired media item. The interaction module 108 can determine when a user posts a comment in response to a given media item and can store information describing this relationship. Other forms of user interaction can include reacting to a media item (e.g., selecting an option that corresponds to a particular reaction, e.g., happy, sad, angry, etc.) and sharing a media item, to name some examples.

In some embodiments, the story module 110 can provide an option that allows users to post their content as stories. In such embodiments, each user has a corresponding story in which the user can post content. When a user's story is accessed by another user, the story module 110 can provide content posted in the story to the other user for viewing. In general, content posted in a user's story may be accessible by any user of the social networking system. In some embodiments, content posted in a user's story may only be accessible to followers of the user. In some embodiments, user stories expire after a pre-defined time interval (e.g., every 24 hours). In such embodiments, content posted in stories is treated as ephemeral content that is made inaccessible once the pre-defined time interval has elapsed. In contrast, content posted in a user's content feed can be treated as non-ephemeral content that remains accessible for an indefinite period of time.

In various embodiments, the multi-author story module 112 is configured to generate and distribute multi-author stories through the social networking system. When generating a multi-author story, the multi-author story module 112 can group content based on various criteria associated with the multi-author story being generated. For example, when generating a multi-author story that corresponds to a particular geographic region (e.g., New York, N.Y.), the multi-author story module 112 can group media items that originated from the city of New York. In general, the content used to generate a multi-author story may be selected from any content that was posted by users of the social networking system, including content that was posted by users in their respective stories, content that was posted by users in their respective content feeds, or a combination thereof. Multi-author stories may be generated based on myriad themes. For example, a multi-author story may be generated using media items that share one or more pre-defined tags (e.g., hash tags, tagged points of interest, tagged users, etc.). In another example, a multi-author story may be generated using media items that relate to a given geographic location (e.g., point of interest, city, state, country, etc.). In yet another example, a multi-author story may be generated using media items that are visually similar or share visual features (e.g., media items that capture subject matter including a red telephone booth).

Figure 4A:
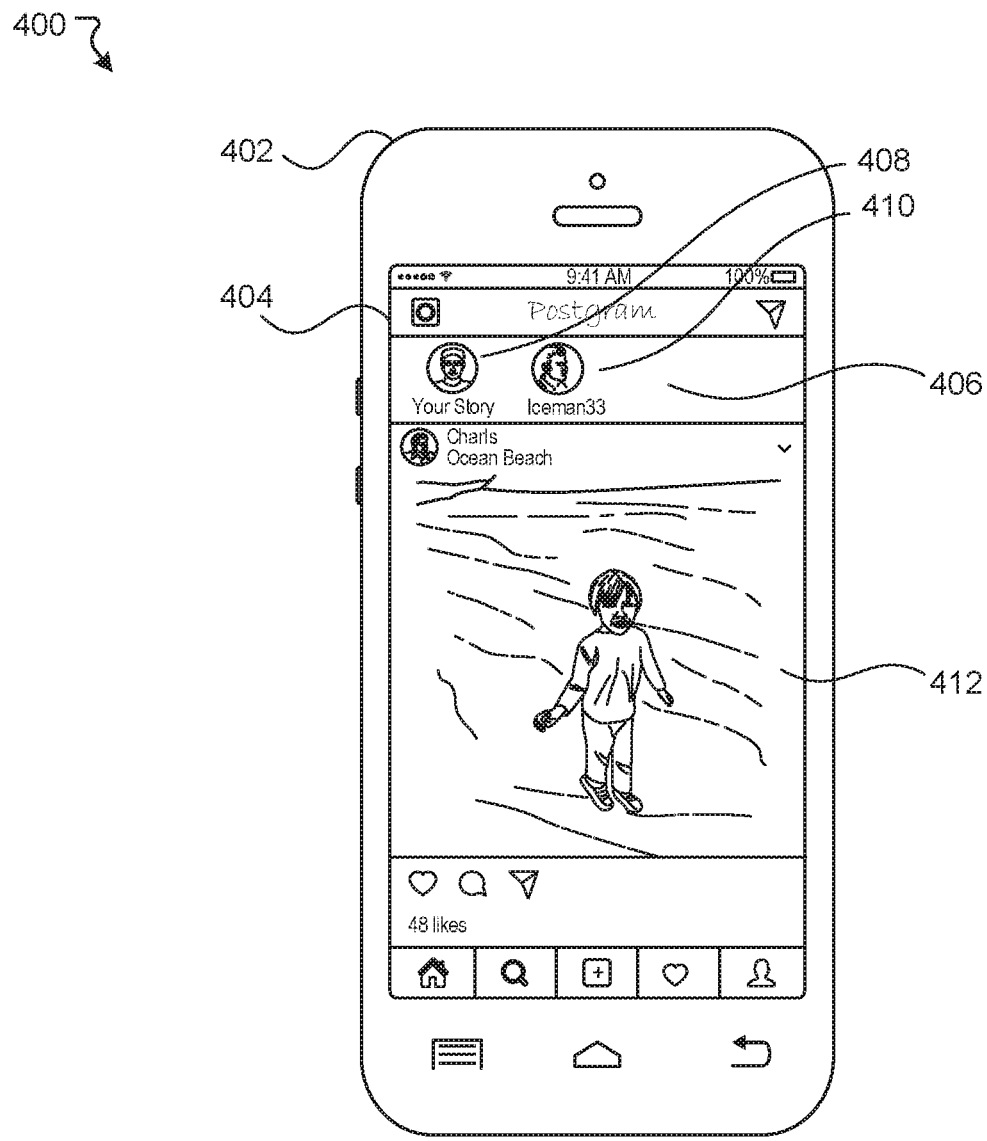
FIGS. 4A-4B illustrate example interfaces, according to an embodiment of the present disclosure.
Figure 4B:
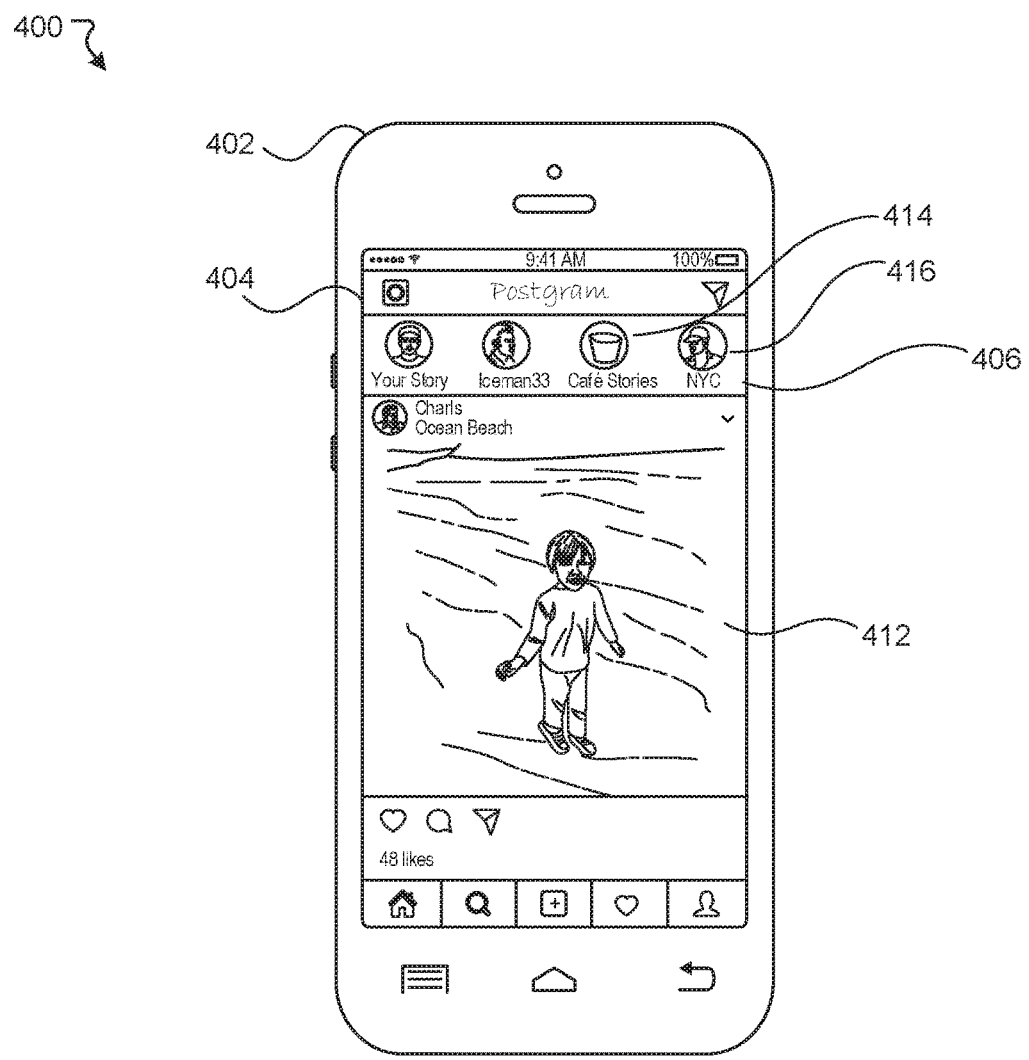

In various embodiments, multi-author stories can be accessed through an interface. In some embodiments, each multi-author story can be associated with a representative media item (e.g., cover photo, thumbnail, etc.). This representative media item can be used to identify and access the multi-author story through an interface as illustrated in the examples of FIGS. 4A-4B. The media selection module 114 can be configured to determine representative media items. In some embodiments, a representative media item for a multi-author story can be selected from media items that were included in the multi-author story. In general, the approaches described herein are not limited to multi-author stories and may be used to determine representative media items for any group (or collection) of media items (e.g., images, video frames). Additional details regarding the media selection module 114 are provided below with reference to FIG. 2.

Figure 2:
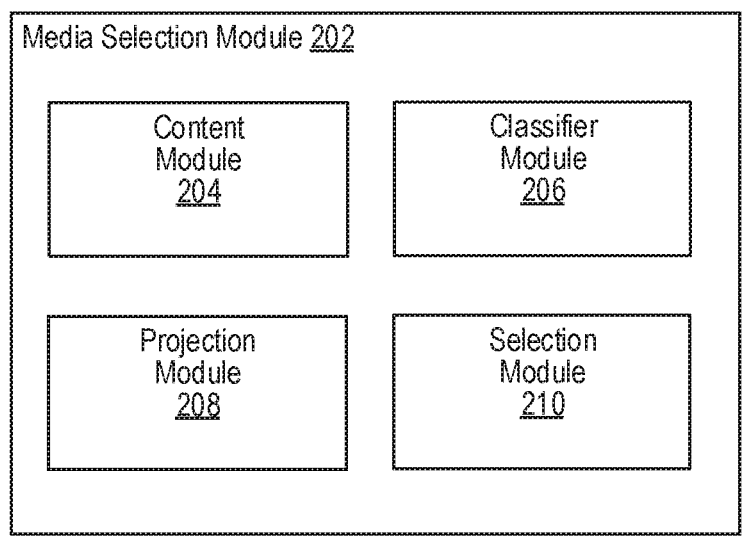
FIG. 2 illustrates an example media selection module, according to an embodiment of the present disclosure.

FIG. 2 illustrates a media selection module 202, according to an embodiment of the present disclosure. In some embodiments, the media selection module 114 of FIG. 1 can be implemented with the media selection module 202. As shown in the example of FIG. 2, the media selection module 202 can include a content module 204, a classifier module 206, a projection module 208, and a selection module 210.

The content module 204 can be configured to obtain a set of media items from which a representative media item is to be determined. For example, the content module 204 can obtain media items included in a multi-author story. In this example, a representative media item for the multi-author story can be generated from the media items. As mentioned, representative media items can be generated for any arbitrary grouping (or collection) of media items whether curated manually or automatically. For example, the content module 204 can obtain media items included in a photo album for purposes of determining a representative media item for the photo album.

The classifier module 206 can be configured to obtain semantic feature representations for each media item obtained by the content module 204. For example, in some embodiments, the classifier module 206 can determine a high-dimensional floating point vector for each media item based on its captured subject matter using a trained machine learning model (content classifier). In some embodiments, the respective high-dimensional floating point vectors determined for the media items each correspond to some pre-defined number of dimensions (e.g., 2,048 dimensions, 4,096 dimensions, etc.).

In various embodiments, the content classifier supported by the classifier module 206 can be trained and tested to determine semantic feature representations for inputted media items. In a development phase, contextual cues for a sample set of images can be gathered. Images classes corresponding to various subject matter can be determined. Correlation of the sample set of images with the image classes based on the contextual cues can be determined. A training set of images can be generated from the sample set of images based on scores indicative of high correlation. The training set of images can be used to train the content classifier to generate semantic feature representations corresponding to the image classes. In an evaluation phase, the content classifier can be applied to a new image to determine a corresponding semantic feature representation (e.g., high-dimensional floating point vector) that describes the subject matter reflected in the new image. In general, the content classifier can be based on any machine learning technique, including but not limited to a deep convolutional neural network. In various embodiments, the deep convolutional neural network can include a set of layers including, for example, one or more convolutional layers, one or more fully connected layers, and a semantic layer that outputs respective semantic feature representations for inputted media items.

The projection module 208 can be configured to project semantic feature representations in a semantic space. For example, the projection module 208 can plot semantic feature representations corresponding to media items in a multi-author story. In some embodiments, the semantic feature representations can be plotted in n-dimensional semantic space. For example, in some embodiments, the semantic feature representations can be plotted in a two-dimensional semantic space. In general, semantic feature representations corresponding to similar media items (e.g., media items that capture similar subject matter) have a greater semantic similarity than semantic feature representations corresponding to dissimilar media items (e.g., media items that capture dissimilar subject matter). Thus, unlike semantic feature representations of dissimilar media items, semantic feature representations of similar media items are generally plotted in close proximity to one another.

In general, the projection module 208 can use any generally known approach for projecting semantic feature representations. For example, in some embodiments, the projection module 208 can apply the k-medoids algorithm to plot and cluster semantic feature representations of media items from which a representative media item is being determined. In another example, in some embodiments, the projection module 208 can apply the t-distributed stochastic neighbor embedding (t-SNE) algorithm. In such embodiments, the t-SNE technique can embed semantic feature representations (e.g., high-dimensional floating point vectors) of media items into a set of dimensions (e.g., two dimensions). These embedded semantic feature representations can be then be visualized, for example, in a scatter plot. As mentioned, semantic feature representations corresponding to similar media items tend to have a greater semantic similarity than semantic feature representations corresponding to dissimilar media items.

The selection module 210 can determine a representative media item from a set of media items. In some embodiments, after semantic feature representations of a set of media items have been projected, the selection module 210 can identify a medoid of the plotted semantic feature representations. Once the medoid is identified, the selection module 210 can identify a media item in the set that corresponds to a semantic feature representation of the medoid. This media item can then be used as the representative media item for the set of media items. For example, the representative media item can be used as an icon (or overlay) for an option through which the set of media items can be accessed through an interface.

In various embodiments, the media selection module 202 can be configured to determine a new representative media item for a set of media items when various trigger conditions are satisfied. For example, in some instances, a set of media items from which a representative media item was determined may include media items that expire (e.g., ephemeral content, stories, etc.). In this example, expiration of the media item that was selected as the representative media item can satisfy a trigger condition for determining a new representative media item for the set of media items. This new representative media item can be determined using the approaches described above. Other types of trigger conditions for determining a new representative media item can be used. For example, in some embodiments, a new representative media item can be generated when a specified time period has elapsed (e.g., every 24 hours). In some embodiments, a new representative media item can be generated for a set of media items when a count of media items included in the set changes by some threshold amount (e.g., number, percentage). For example, if additional media items added to the set cause the number of media items in the set to increase by some threshold amount (e.g., new stories were added to a multi-author story), then a new representative media item can be determined from the updated set of media items. Similarly, if media items removed from the set cause the number of media items in the set to decrease by some threshold amount (e.g., expired stories were removed from a multi-author story), then a new representative media item can be determined from the updated set of media items.

Figure 3A:
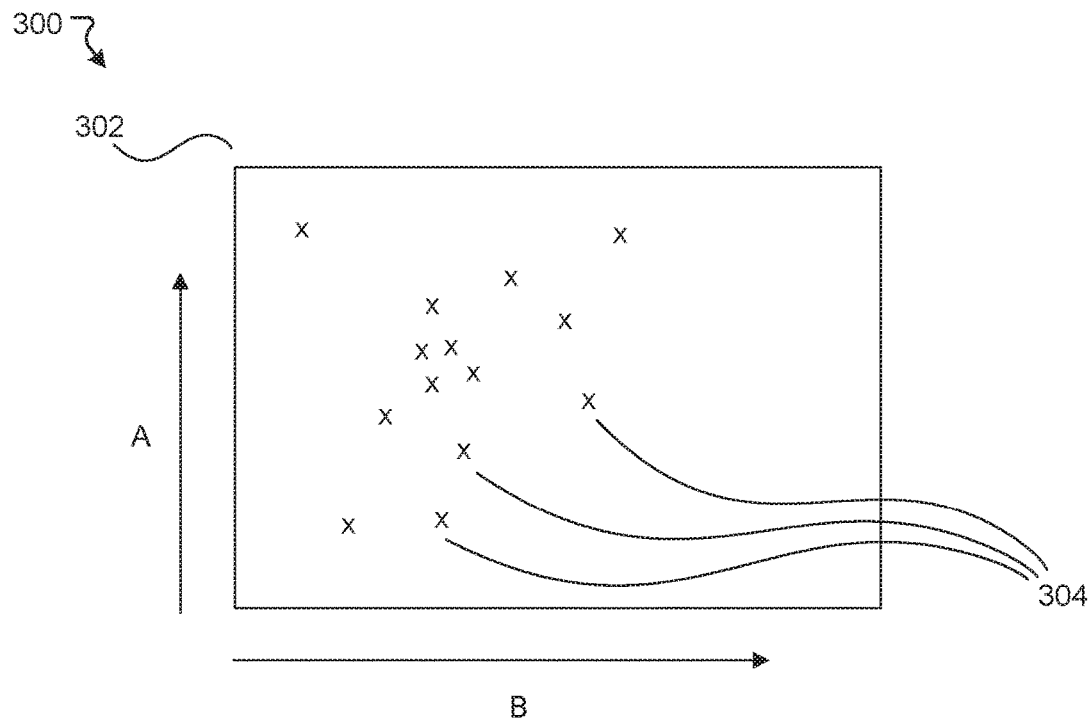
FIGS. 3A-3B illustrate example diagrams, according to an embodiment of the present disclosure.
Figure 3B:
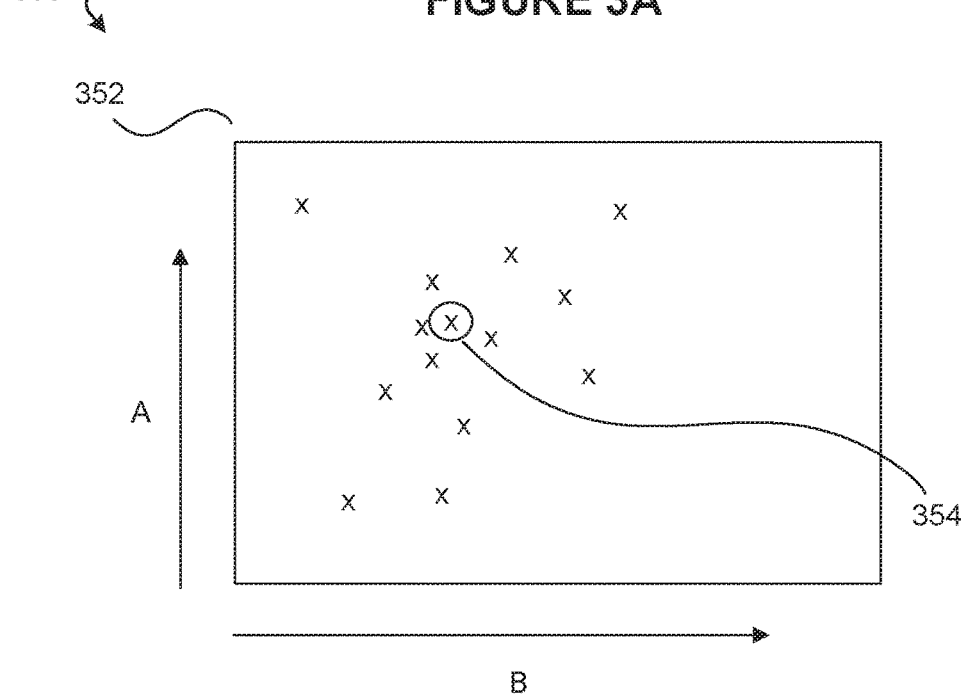

FIG. 3A illustrates an example of an a diagram 300, according to an embodiment of the present disclosure. The diagram 300 includes a visualization 302 of projected semantic feature representations 304 corresponding to a set of media items from which a representative media item is being determined. In various embodiments, these semantic feature representations 304 may be projected in any n-dimensional space with the number of dimensions being defined by the implementation. In the example of FIG. 3A, the semantic feature representations 304 were projected in a two-dimensional semantic space. As mentioned, in some embodiments, a medoid 354 of the projected semantic feature representations can be determined, as illustrated in the example of FIG. 3B. In such embodiments, the medoid 354 can be used to identify the representative media item for the set of media items. For example, a semantic feature representation corresponding to the medoid 354 can be determined. This semantic feature representation can then be used to identify a corresponding media item from which the semantic feature representation was determined. This identified media item can then be used as the representative media item for the set of media items.

FIG. 4A illustrates an example 400 of an interface 404, according to an embodiment of the present disclosure. In this example, the interface 404 is presented through a display screen of a computing device 402. Further, the interface 404 may be provided through an application (e.g., a web browser, a social networking application, messenger application, etc.) running on the computing device 402 that is configured to interact with a social networking system. In the example of FIG. 4A, the interface 404 provides access to ephemeral stories through a first region 406 of the interface 404 and access to a non-ephemeral content feed of a user operating the computing device 402 through a second region 412 of the interface 404. In this example, the first region 406 includes a story 408 corresponding to the user operating the computing device 402 and a story 410 corresponding to another user of the social networking system. As mentioned, the user can post media items to the story 408. Media items posted in the user's story 408 can be accessed by other users of the social networking system. Further, the user can access the story 410 to view media items that were posted by the other user. In some embodiments, multi-author stories can be generated using any of the approaches described above either alone or in combination. In such embodiments, access to multi-author stories can be provided to eligible users through the first region 406 of the interface 404. For example, as illustrated in the example of FIG. 4B, the user is provided access to a café themed multi-author story 414 and a city themed multi-author story 416. In this example, the café themed multi-author story 414 and the city themed multi-author story 416 were generated by grouping content posted through the social networking system based on various criteria associated with each multi-author story as described above. In various embodiments, a respective representative media item can be determined for the café themed multi-author story 414 and the city themed multi-author story 416 using the approaches described above. A representative media item of a multi-author story can be used to identify the multi-author story. For example, an icon corresponding to the representative media item can be used as an overlay for an option to access the multi-author story as illustrated in the example of FIG. 4B.

Figure 5:
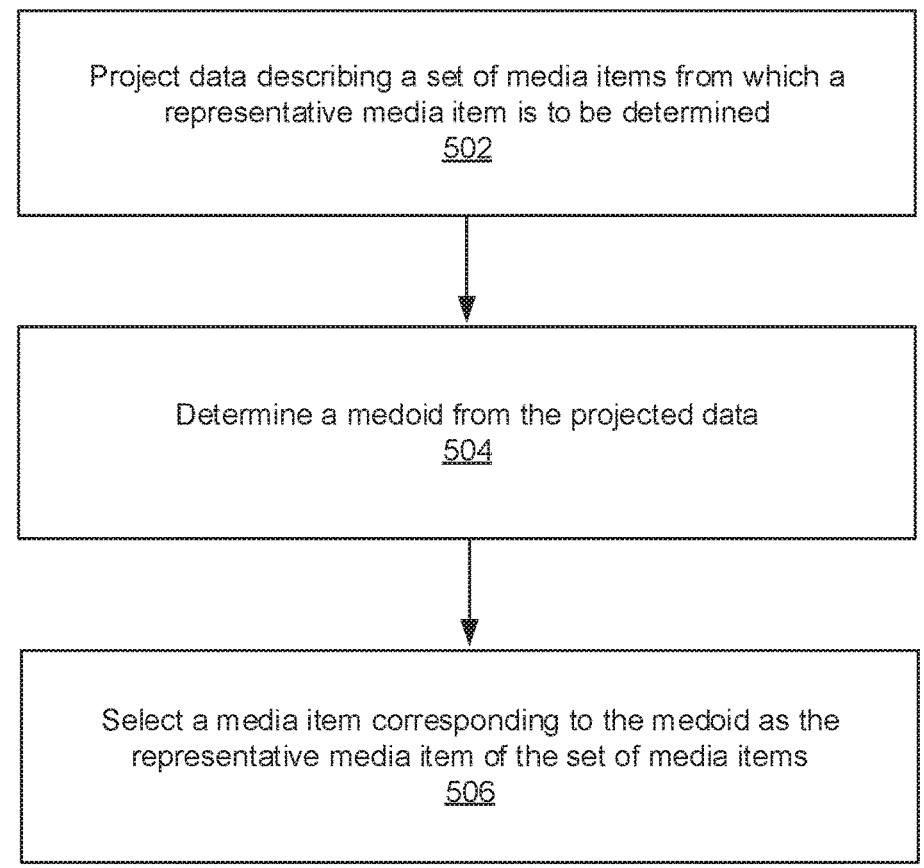
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, data describing a set of media items from which a representative media item is to be determined can be projected. At block 504, a medoid can be determined from the projected data. At block 506, a media item corresponding to the medoid can be selected as the representative media item of the set of media items.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
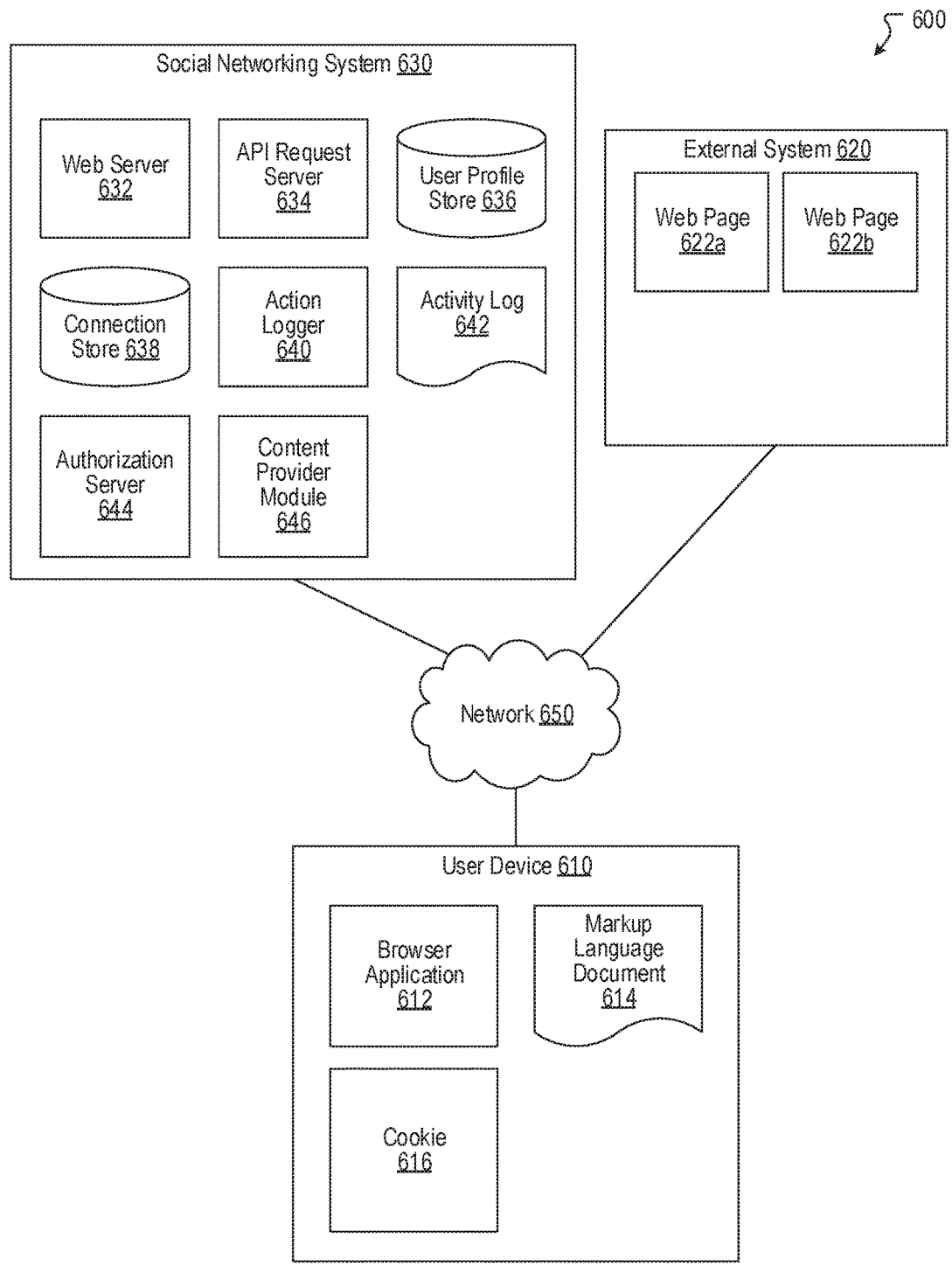
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, media items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and media items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, in whole or in part, is also implemented in the user device 610. As discussed previously, it should be appreciated that there can be many variations or other possibilities.

Hardware Implementation

Figure 7:
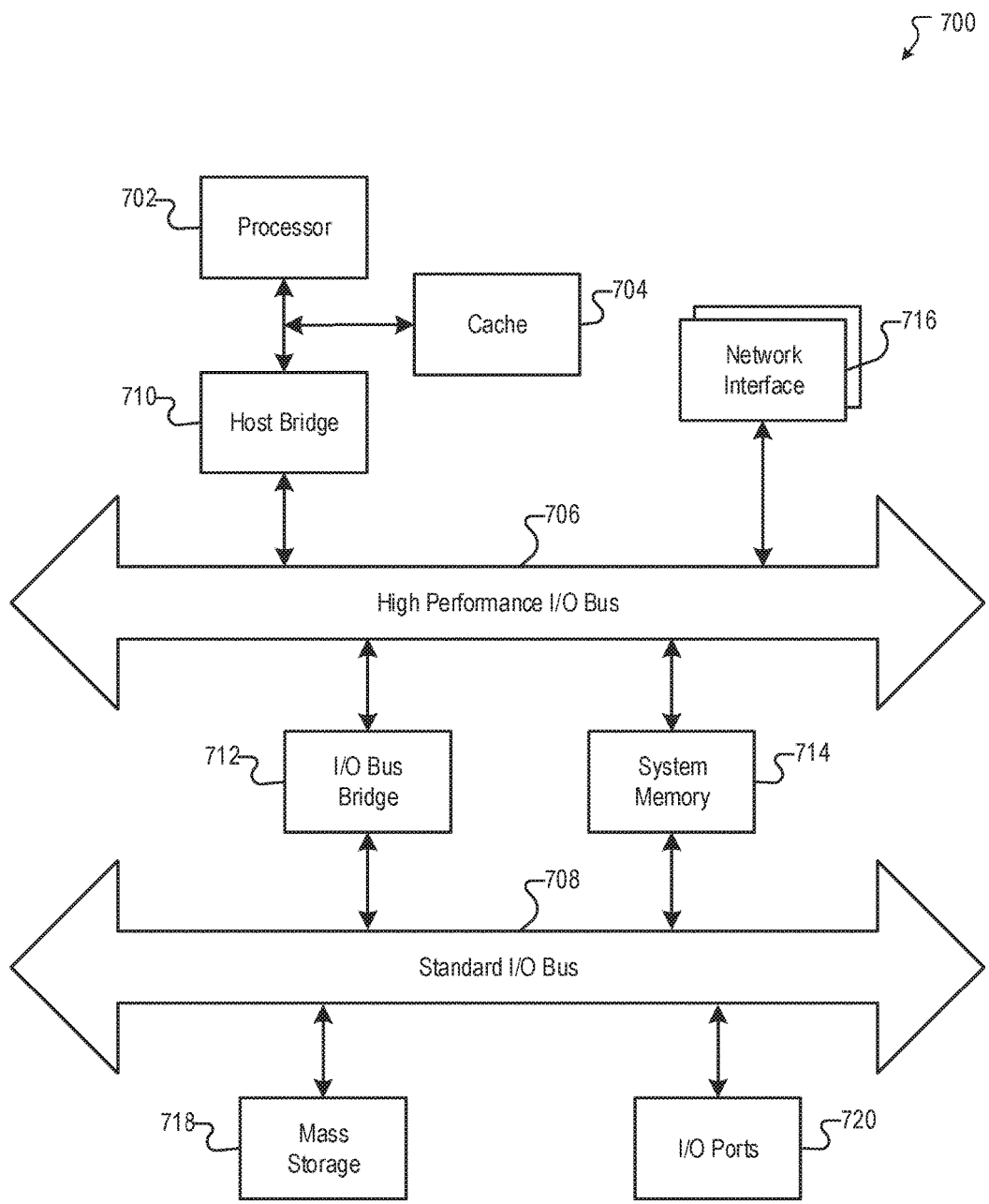
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
projecting, by a computing system, data describing a set of media items from which a representative media item is to be determined, wherein the set of media items correspond to media items included in a multi-author story published through a social networking system, and wherein the set of media items includes one or more ephemeral media items associated with the multi-author story, wherein each of the one or more ephemeral media items expires after a pre-defined period of time;
determining, by the computing system, a medoid from the projected data; and
selecting, by the computing system, a media item corresponding to the medoid as the representative media item of the set of media items, wherein the selected media item is an ephemeral media item.

2. The computer-implemented method of claim 1, wherein projecting the data describing the set of media items further comprises:
determining, by the computing system, respective semantic feature representations for each of the media items in the set; and
projecting, by the computing system, the semantic feature representations in a semantic space.

3. The computer-implemented method of claim 2, wherein a semantic feature representation corresponds to a high-dimensional floating point vector, and wherein the high-dimensional floating point vector is projected onto a two-dimensional semantic space.

4. The computer-implemented method of claim 1, wherein a semantic feature representation of a media item is determined based at least in part on visual features included in subject matter captured in the media item.

5. The computer-implemented method of claim 1, wherein selecting the media item corresponding to the medoid further comprises:
identifying, by the computing system, a semantic feature representation corresponding to the medoid; and
identifying, by the computing system, the media item from which the semantic feature representation was determined.

6. The computer-implemented method of claim 1, wherein the representative media item is associated with the multi-author story.

7. The computer-implemented method of claim 6, wherein the representative media item is used as an icon to represent the multi-author story in an interface.

8. The computer-implemented method of claim 1, wherein the set of media items correspond to media items included in a multi-author story, the method further comprising:
determining, by the computing system, a new representative media item for the multi-author story in response to at least one trigger condition being satisfied.

9. The computer-implemented method of claim 8, wherein the trigger condition is satisfied when the media item corresponding to the medoid expires, after a specified time period, or a threshold change in the number of media items included in the set of media items.

10. The computer-implemented method of claim 8, wherein determining the new representative media item further comprises:
obtaining, by the computing system, an updated set of media items included in the multi-author story;
projecting, by the computing system, data describing the updated set of media items;
determining, by the computing system, a new medoid from the projected data describing the updated set of media items; and
selecting, by the computing system, a new media item corresponding to the new medoid as the new representative media item of the updated set of media items.

11. A system comprising:
at least one processor; and
a memory storing instructions that, when executed by the at least one processor, cause the system to perform:
projecting data describing a set of media items from which a representative media item is to be determined, wherein the set of media items correspond to media items included in a multi-author story published through a social networking system, and wherein the set of media items includes one or more ephemeral media items associated with the multi-author story, wherein each of the one or more ephemeral media items expires after a pre-defined period of time;
determining a medoid from the projected data; and
selecting a media item corresponding to the medoid as the representative media item of the set of media items, wherein the selected media item is an ephemeral media item.

12. The system of claim 11, wherein projecting the data describing the set of media items further causes the system to perform:
determining respective semantic feature representations for each of the media items in the set; and
projecting the semantic feature representations in a semantic space.

13. The system of claim 12, wherein a semantic feature representation corresponds to a high-dimensional floating point vector, and wherein the high-dimensional floating point vector is projected onto a two-dimensional semantic space.

14. The system of claim 11, wherein a semantic feature representation of a media item is determined based at least in part on visual features included in subject matter captured in the media item.

15. The system of claim 11, wherein selecting the media item corresponding to the medoid further causes the system to perform:
 identifying a semantic feature representation corresponding to the medoid; and
 identifying the media item from which the semantic feature representation was determined.

16. A non-transitory computer-readable storage medium including instructions that, when executed by at least one processor of a computing system, cause the computing system to perform a method comprising:
 projecting data describing a set of media items from which a representative media item is to be determined, wherein the set of media items correspond to media items included in a multi-author story published through a social networking system, and wherein the set of media items includes one or more ephemeral media items associated with the multi-author story, wherein each of the one or more ephemeral media items expires after a pre-defined period of time;
 determining a medoid from the projected data; and
 selecting a media item corresponding to the medoid as the representative media item of the set of media items, wherein the selected media item is an ephemeral media item.

17. The non-transitory computer-readable storage medium of claim 16, wherein projecting the data describing the set of media items further causes the computing system to perform:
 determining respective semantic feature representations for each of the media items in the set; and
 projecting the semantic feature representations in a semantic space.

18. The non-transitory computer-readable storage medium of claim 17, wherein a semantic feature representation corresponds to a high-dimensional floating point vector, and wherein the high-dimensional floating point vector is projected onto a two-dimensional semantic space.

19. The non-transitory computer-readable storage medium of claim 16, wherein a semantic feature representation of a media item is determined based at least in part on visual features included in subject matter captured in the media item.

20. The non-transitory computer-readable storage medium of claim 16, wherein selecting the media item corresponding to the medoid further causes the computing system to perform:
 identifying a semantic feature representation corresponding to the medoid; and
 identifying the media item from which the semantic feature representation was determined.

\* \* \* \* \*